Dec. 15, 1931.  K. FRIESE  1,836,369
AUTOMOBILE AXLE AND FRAME STRAIGHTENING DEVICE
Filed Sept. 29, 1930  4 Sheets-Sheet 1
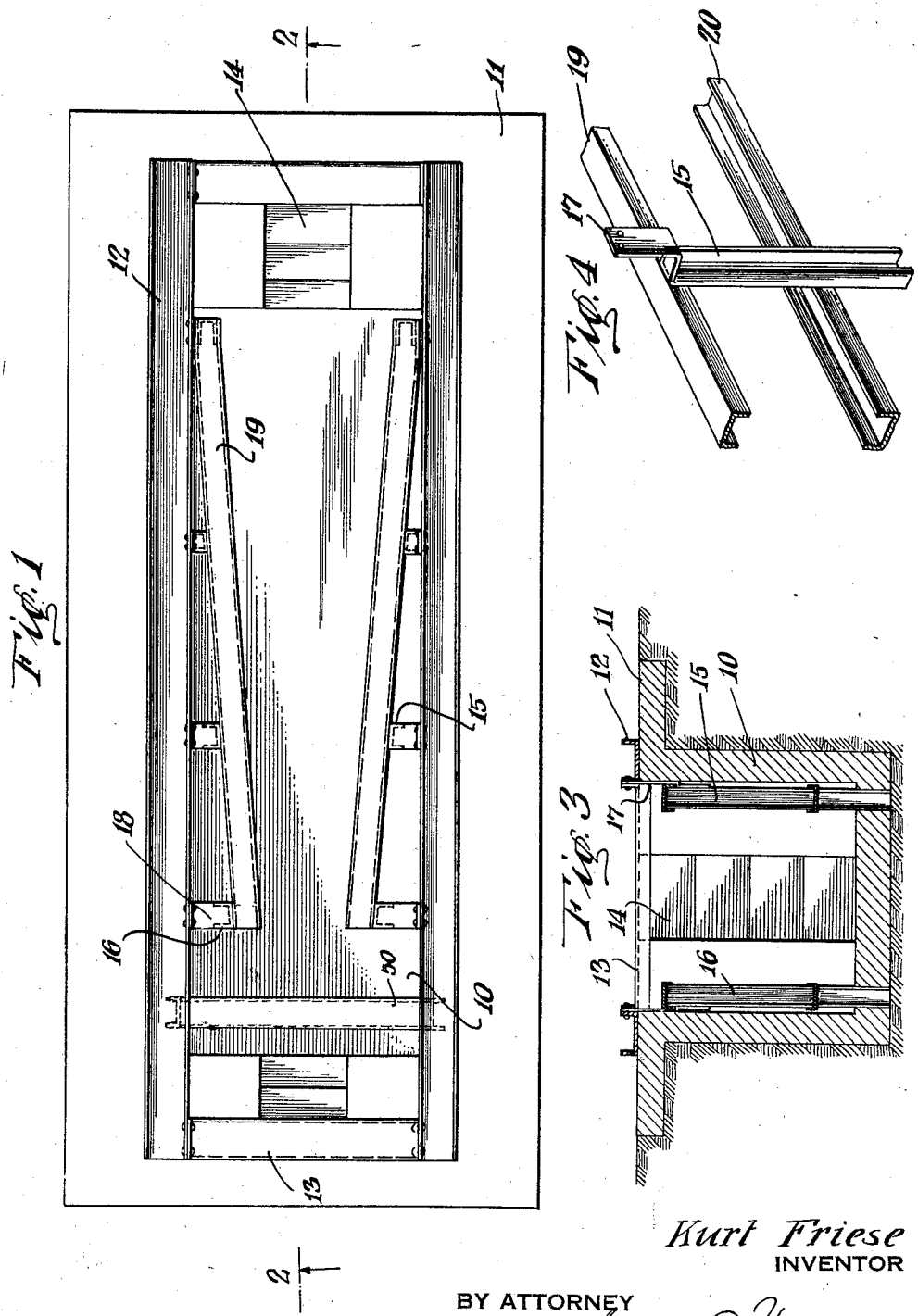
Kurt Friese
INVENTOR
BY ATTORNEY Dec. 15, 1931.  K. FRIESE  1,836,369
AUTOMOBILE AXLE AND FRAME STRAIGHTENING DEVICE
Filed Sept. 29, 1930    4 Sheets-Sheet 2
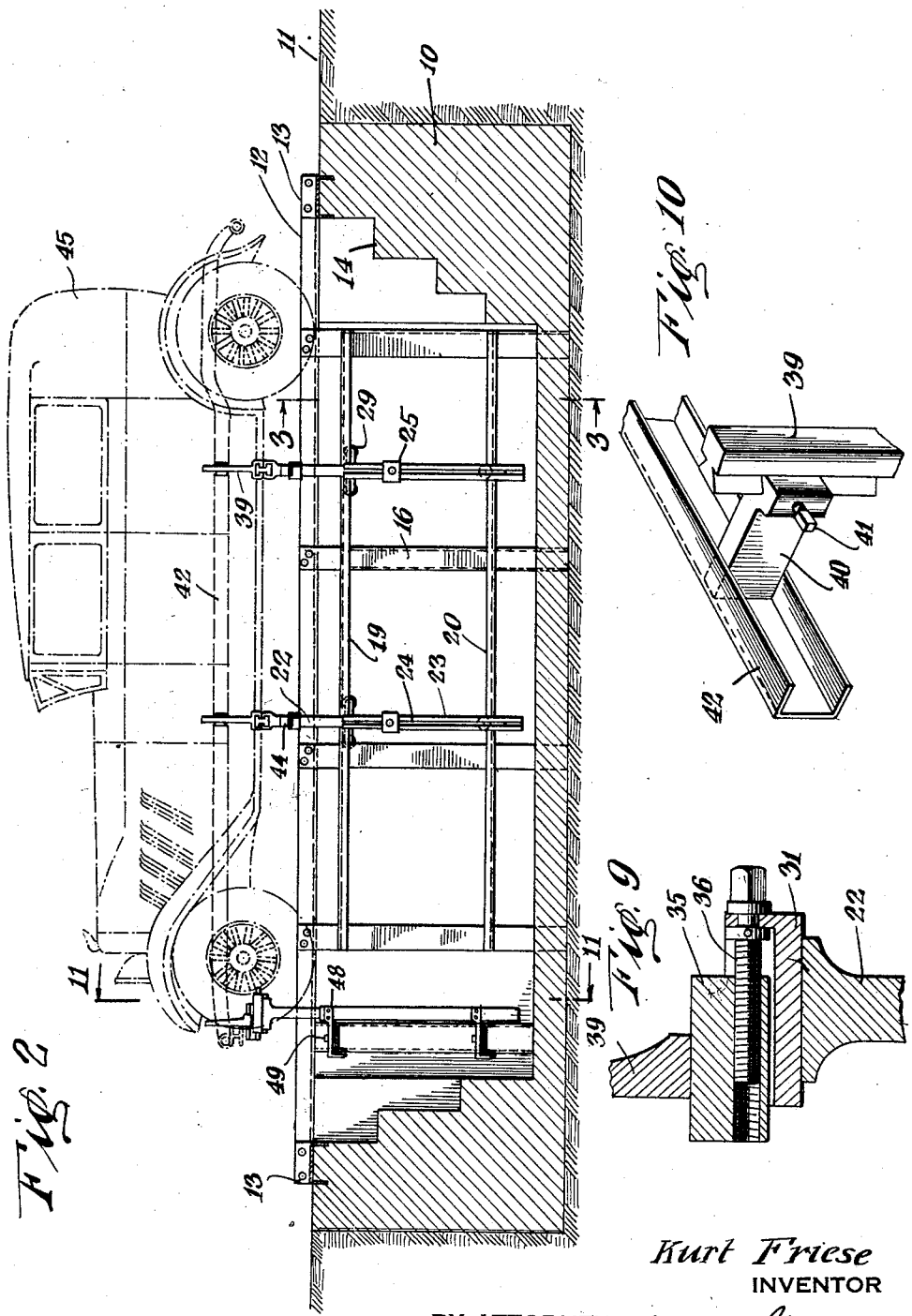
Kurt Friese
INVENTOR
BY ATTORNEY

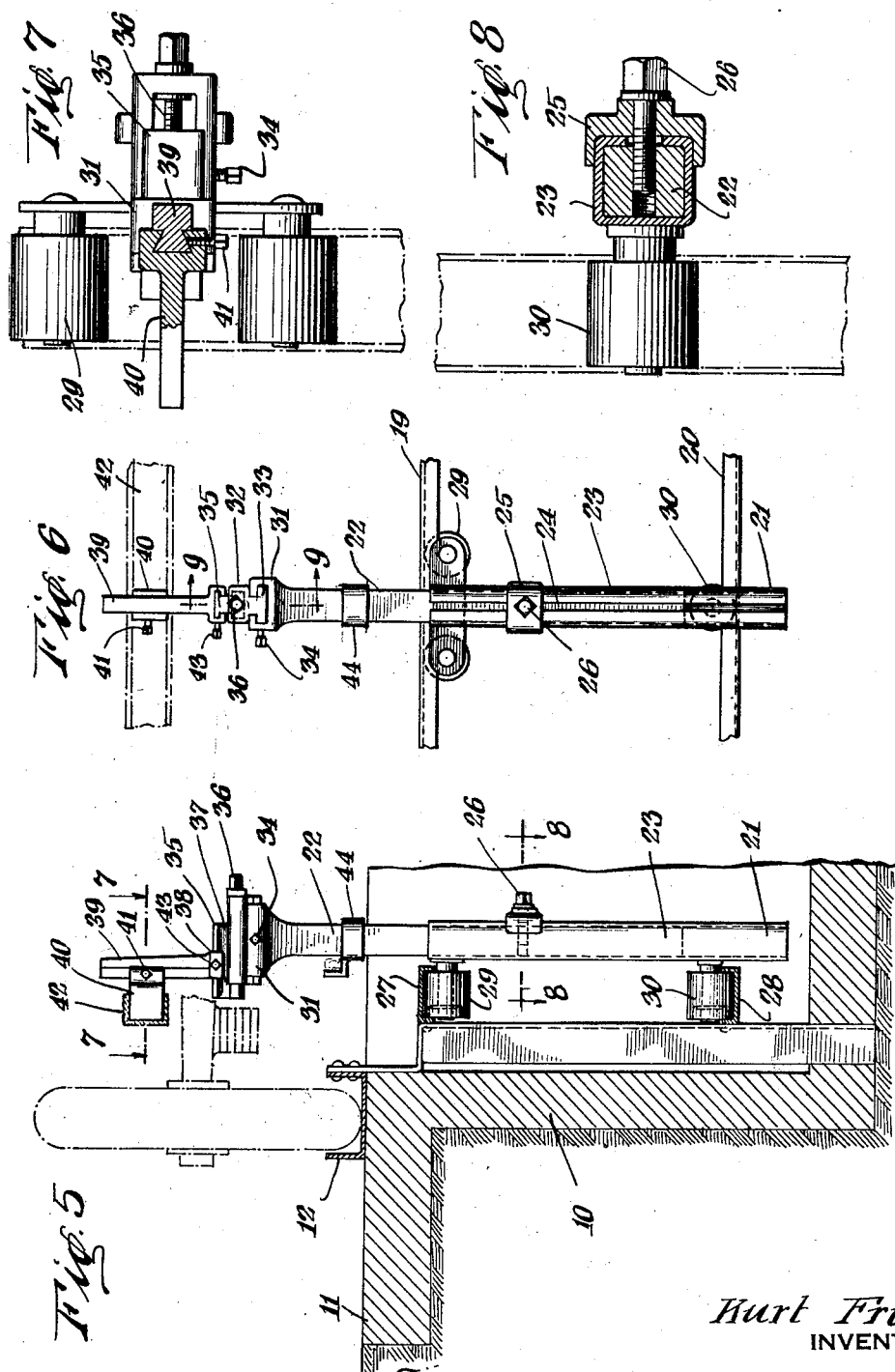

Dec. 15, 1931.  K. FRIESE  1,836,369
AUTOMOBILE AXLE AND FRAME STRAIGHTENING DEVICE
Filed Sept. 29, 1930  4 Sheets-Sheet 4
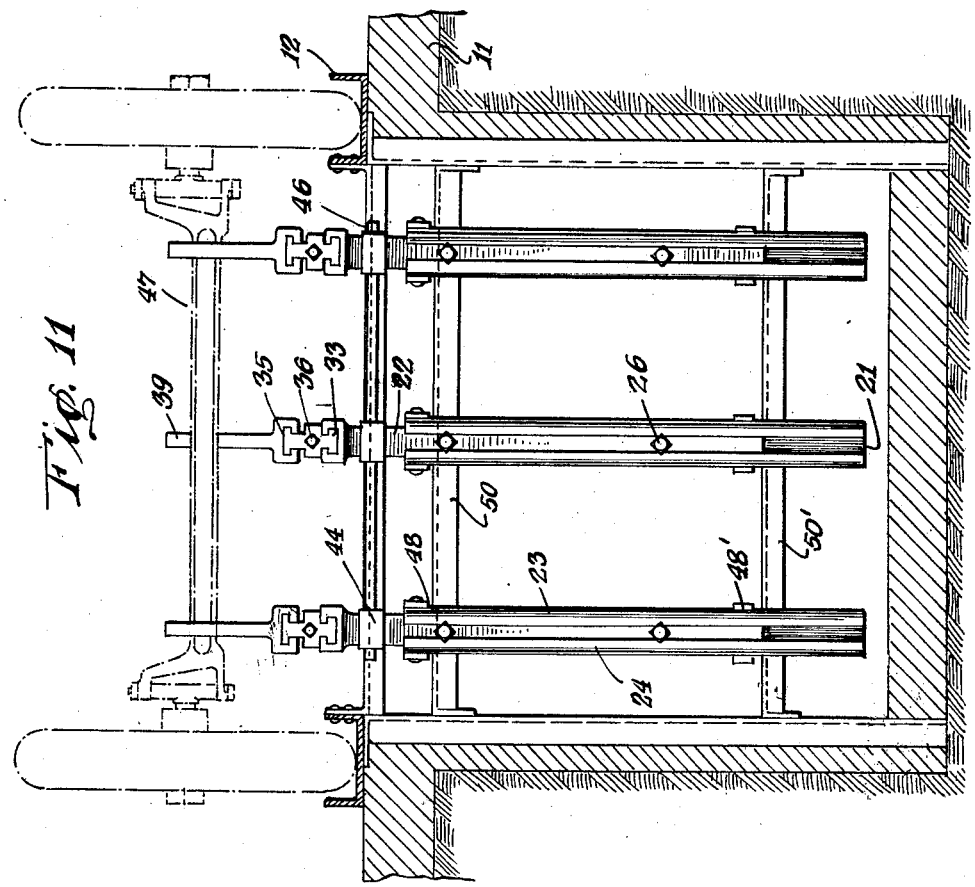
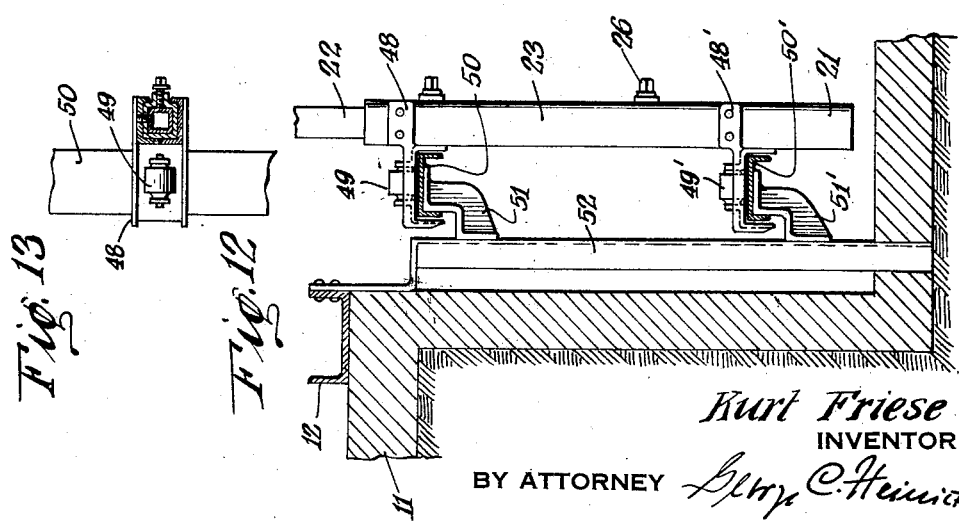
Kurt Friese
INVENTOR
BY ATTORNEY Patented Dec. 15, 1931

1,836,369

UNITED STATES PATENT OFFICE

KURT FRIESE, OF NORWALK, CONNECTICUT

AUTOMOBILE AXLE AND FRAME STRAIGHTENING DEVICE

Application filed September 29, 1930. Serial No. 485,129.

This invention relates to improvements in devices for repairing damaged automobiles, particularly to devices for straightening the frames and axles of automobiles which have been bent out of their proper shape by collisions or other accidents, and it is the principal object of my invention to provide a device of this character including a pit over which the damaged automobile is driven and which is equipped with a frame for allowing the displaceable arrangement of a plurality of jacks therein engaging with their tool- or operating-faces the bent automobile frame or axle at opposite points of the bends without the necessity of removing the body or the motor from the automobile frame.

Another object of my invention is the provision of a repair device for the bent axles or frames of automobiles including jacks adjustable to any size and make of cars which can be readily moved from place to place.

Still another object of my invention is the provision of an automobile repair-jack of comparatively simple and therefore inexpensive construction, yet durable and highly efficient in operation.

A further object of my invention is the provision of an automobile repair-jack having its adjustable head equipped with means for tightly engaging the frame or axle of a damaged automobile and allowing a quick adjustment for any make or type of car.

A still further object of my invention is the provision of a pit for facilitating the repair of damaged automobiles over which the car may be placed and which has ample room for the workmen, while a pair of frames converging towards one end of the pit are provided for the ready application and adjustment of the jacks.

These and other objects and advantages of my invention will become more fully known as the description thereof proceeds and will then be specifically defined in the appended claims.

In the accompanying drawings forming a material part of this disclosure:

Fig. 1 is a top plan view of a pit forming part of the automobile frame and axle straightening device constructed according to my invention.

Fig. 2 is a longitudinal section on line 2—2 of Figure 1 showing an automobile in broken lines above the pit.

Fig. 3 is a cross-section on line 3—3 of Figure 2.

Fig. 4 is a fragmentary perspective detail view of the pit frame.

Fig. 5 is a fragmentary sectional detail view of a pit showing a jack therein in operative position.

Fig. 6 is a front elevation of a straightening jack.

Fig. 7 is a top plan view thereof, partly in section on line 7—7 of Figure 5.

Fig. 8 is a cross-section on line 8—8 of Figure 5.

Fig. 9 is a section on line 9—9 of Figure 6.

Fig. 10 is a perspective detail view of a tool head.

Fig. 11 is a sectional inner end view illustrating the straightening of an axle, the section being taken on line 11—11 of Figure 2.

Fig. 12 is a partial end elevation of the device illustrated in Figure 11.

Fig. 13 is a fragmentary top plan view thereof, partly in section.

As illustrated a pit 10 of sufficient depth to accommodate a mechanic and made of any suitable material has secured to its marginal surface plate 11, channel irons 12 or the like in which the wheels of an automobile placed over the pit run and rest. The irons 12 are connected at their ends by iron beams 13 or the like, and steps 14 lead into the pit at both ends thereof.

Within the pit, near its inner side walls vertical posts 15, 16 are provided sunk with their lower ends into openings in the bottom of the pit, while their upper bent ends are secured to the U-channel irons 12, as at 17, and the bent ends 18 of the posts 15, 16, near one end of the pit are spaced further apart than that at the other about the shape of a chassis frame.

Pairwise arranged U-beams 19, 20 in superposition secured to posts 15, 16 form frames converging towards one end of the pit and serve a purpose more fully to be described hereafter.

The straightening tools or jacks generally designated at 21 are each composed of two shanks 22, 23, the lower 23 of which is substantially U-shaped in cross-section with inwardly bent, oppositely disposed end flanges 24 forming a guide for the upper shanks 22 in which the same endwise engage for vertical reciprocation, and bands 25 through which set screws 26 pass, serve to lock the shanks in their relative adjusted positions.

The lower shanks 23 are equipped at one of their faces preferably the one oppositely disposed to the end flanges 24 with upper and lower brackets 27, 28, and rollers 29, 30, engage beams 19, 20, and facilitate the displacement of the jacks along the same.

The heads 31 of the jacks are grooved, and in the grooves are slidably arranged members 32, each having a foot flange 33, and set screws 34 lock the members 32 in their adjusted position in the groove of the heads 31.

Each member 32 above its foot flange has a groove formed therein in which slides a block 35 having a longitudinal bore for the reception of a threaded bolt 36 to allow a movement of the block in both directions.

The side walls of the blocks 35 are grooved, as at 37, and in these grooves engage the inwardly bent foot flanges 38 of a tool 39, the upper end of which carries a lug 40 which can be locked in its vertically adjustable position to tool 39, by means of a set screw 41 and adapted to engage with its outer end the channel of the automobile frame 42.

The tool 39 can be locked in its relative adjusted position to the block 35 by means of a set screw 43, and each jack has on its shank 22 a bracket 44 for the support of rails 46 coupling any number of brackets.

In Figures 11, 12, and 13 I have illustrated an application of the jacks, if it is desired to straighten the bent axle 47 of an automobile.

In this instance, the jacks 21 are coupled by means of bars or rails 46 placed over brackets 44, and brackets 48, 48', on the jacks carrying rollers 49, 49', running in U-irons 50, 50', supported by brackets 51, 51' attached to upright posts or standards 52 in the front part of the pit.

Figure 13, shows in cross-section a modified form of jack the central part of which forms a closed body reciprocating vertically in a hollow shank in which it is guarded by a pin and in which it is locked in its adjusted position by means of a headed pin.

The device operates as follows:

If a damaged automobile generally designated 45 is driven over the pit with its wheels running in the U-channels 12, and a bent part of its frame 43 is to be straightened, two jacks are placed into the pit and their shanks are relatively adjusted and locked by set screws 26, their lugs 40 are then engaged in the U-groove of the automobile frame, in juxtaposition determined by the size of the bent part of the automobile frame, coupling rails may be placed on brackets 44 to couple two or more jacks.

If now screws 36 are operated by means of suitable tools the bent part will quickly be straightened. In the same manner an axle or rear housing cross bar is straightened by placing the required number of jacks with their operating tool heads in the proper positions.

It will be clear that the rollers 29, 30, will allow a ready shifting of the jack along rails 19, 20, to any place of operation.

It will be understood that I have disclosed the preferred form of my straightening device only as one example of the many possible ways to practically construct the same, and that I may make such changes in the general arrangement and the minor details and combination thereof as come within the scope of the appended claims without departure from the spirit of my invention and the principles involved.

Having thus described my invention, what I claim as new and desire to secure by Letters Patent is:

1. In a device of the class described a plurality of jacks adapted to be displaceably guided in a pit over which an automobile is placed, each of said jacks comprising a shank, a slotted sleeve in which said shank reciprocates vertically, guide rails in said pit, brackets on said sleeve, rollers on said brackets running on said guide rails, means for locking the shanks in their respective relative adjustment, brackets on said sleeve for the reception of a coupling bar for coupling a plurality of said jacks and heads on said shank including means for engaging the parts to be straightened, means for displacing said engaging means against the workpiece, and means for locking said means in their operative position.

2. In a device of the character described comprising a plurality of jacks each comprising a head substantially U-shaped in cross-section with upper inturned edges, a block displaceable within said U-head, means for locking said block in its adjusted position relative to said head, a member slidably engaged in said block having lateral grooves, a tool holder having lower inwardly bent edges engaging in said grooves, a tool on said holder for engaging the work-piece, and means for horizontally reciprocating said member in said block to press said tool against the workpiece.

Signed at Norwalk, in the county of Fairfield, and State of Connecticut, this 16th day of September, A. D. 1930.

KURT FRIESE.